United States Patent [19]
Hawkins

[11] Patent Number: 5,269,200
[45] Date of Patent: Dec. 14, 1993

[54] FOOT PEDAL CLIP FOR A BICYCLE

[76] Inventor: Tranel Hawkins, 831 Spencer Ave., San Jose, Calif. 95125

[21] Appl. No.: 938,878

[22] Filed: Aug. 31, 1992

[51] Int. Cl.⁵ .............................................. G06G 1/14
[52] U.S. Cl. ..................................... 74/594.6; 36/131
[58] Field of Search ........................ 74/594.6, 594.4; 36/131

[56] References Cited

U.S. PATENT DOCUMENTS

| | | | |
|---|---|---|---|
| 4,686,867 | 8/1987 | Bernard | 74/594.6 |
| 4,803,894 | 2/1989 | Hervell | 74/594.6 |
| 4,815,333 | 3/1989 | Sampson | 74/594.6 |
| 4,827,633 | 5/1989 | Feldstein | 74/594.6 |
| 4,842,778 | 7/1990 | Byrne | 74/594.6 |
| 4,893,523 | 1/1990 | Lennon | 74/594.6 |
| 4,936,164 | 6/1990 | Forke' | 74/594.6 |
| 5,046,382 | 9/1991 | Steinberg | 74/594.6 |

FOREIGN PATENT DOCUMENTS

| | | | |
|---|---|---|---|
| 0293340 | 5/1989 | European Pat. Off. | |
| 0402512 | 6/1989 | European Pat. Off. | 74/594.6 |
| 3315282 | 10/1984 | Fed. Rep. of Germany | 74/594.6 |
| 3329993 | 3/1985 | Fed. Rep. of Germany | 74/594.6 |
| 2279607 | 2/1976 | France | 74/594.6 |
| 2315875 | 6/1976 | France | 74/594.6 |
| 2634449 | 1/1990 | France | 74/594.6 |
| 53-53849 | 10/1976 | Japan | 74/594.6 |
| 4-11592 | 1/1992 | Japan | 74/594.6 |

OTHER PUBLICATIONS

Cycle Binding ® Jun. 1992 Howell Cycle Binding System Inc.

Primary Examiner—Rodney H. Bonck
Assistant Examiner—Ryan W. Massey
Attorney, Agent, or Firm—Robert Samuel Smith

[57] ABSTRACT

A clip device for detachably engaging the foot of a cyclist to the pedal of his bicycle. The pedal is basically a flat plate, rotatably mounted on the pedal crank, and having an opening extending from one side to the other. A cleat that is bolted to the cyclists shoe has a conical section that extends into the plate opening such that recessible catches on the wall of the conical section engage a groove on the inside wall of the opening. The groove is not a complete ring so that when the ankle is rotated, the catches are recessed thereby permitting withdrawal of the foot from the pedal.

13 Claims, 1 Drawing Sheet

FOOT PEDAL CLIP FOR A BICYCLE

BACKGROUND

1. Field of the Invention:

This invention relates to a footpedal clip system for a bicycle including a cleat attached to a shoe that detachably mates to the pedal and particularly to a system wherein the cleat has a very small profile so that the pedal can be used comfortably with or without the cleat is desired.

2. Prior Art and Information Disclosure Statement:

Bicycling and the design of bicycles has become a hi-tech avocation in terms of features that are intended to reduce the weight, improve maneuverability, minimize injury either from accidents or from repetitive motion stress, increase the comfort of the cyclist particularly engaged in long runs.

Particular attention has been paid to the design of detachable footpedal clip systems whereby the foot is detachably mated to the pedal to prevent the foot from slipping on the pedal as the cyclist tires or when he is accelerating. The requirement is to provide enough security of the foot to the pedal to prevent slippage as described but also enable the cyclist to disengage the foot from the pedal when he desires such as when he is stopping at a crossroad or simply dismounting from the bicycle. Numerous disclosures have appeared in the patent literature.

U.S. Pat. No. 4,803,894 to Howell discloses a system having latch elements that project from the pedal, the latch elements having latch members that are flexible. A socket element on the sole of the cyclists shoe releasably and replacably couples with the latch element for pedalling action and releases from the latch element under non pedalling loads. The problem with this construction is that the foot is released if the cyclist lifts his foot too quickly on the return of the pedal.

U.S. Pat. No. 4,686,867 to Bernard et al discloses a cleat secured to the shoe and a spring loaded cleat.

U.S. Pat. No. 4,827,633 to Feldstein discloses a cleat with a cavity lined with diagonal skewed depressions and a member attached to the pedal that rotatingly engages the cleat.

U.S. Pat. No. 4,815,333 to Sampson discloses a shoe cleat with two downward projections that matingly engage a springloaded member attached to the pedal.

In all of the preceding disclosures, the cleat engages the pedal on only one side of the pedal thereby preventing fast getaways since the rider must first orient the pedal in order to engage the cleat to the pedal.

U.S. Pat. No. 4,942,778 to Byrne discloses a pedal system including a block with a generally convex symmetrical curved top and bottom surface which mates to a concavity in a plate attached to the rider's shoe. The pedal of this arrangement can only be used effectively when the rider is wearing the cleat.

THE INVENTION

OBJECTS

It is an object of this invention to provide a cleat-pedal device for detachably engaging the foot of a cyclist to the pedal of a bicycle.

It is another object that the cleat attached to the rider's shoe may engage either side of the pedal.

It is another object that the pedal be flat on both sides so that the pedal may be conveniently and comfortably used with or without the cleat.

It is another object that the cleat be small and designed to permit the rider to walk comfortably.

It is another object that the system present a low profile for reduced aerodynamic resistance.

It is another object that the pedal be flat on both sides thereby avoiding having to orient the pedal in order to attach the cleat.

It is another object that the strength of engagement of the cleat to the pedal not be dependent on spring tension since the strength of engagement will otherwise diminsh over time as the spring weakens.

SUMMARY

This invention is directed toward a pedal including a pedal plate having an edge rotatably mounted on the pedal crank and a circular opening extending from one broad side of the plate to the other. A transverse circular groove on the inside wall of the opening engages spring loaded catches attached to a cleat attached to the sole of the users shoe when the cleat is inserted into the opening. The transverse groove is not a complete ring around the inner wall complete so that, when the foot is turned, the catches are depressed back into the cleat enabling the cyclist to withdraw his foot from the pedal. The catches have a bevelled edge providing that the cyclist may engage pedal plate and cleat by simply forcing his foot against either pedal plate surface.

DRAWINGS

FIG. 1 is a top view of the cleat.
FIG. 2 is a sectional view of the cleat of FIG. 1
FIG. 3 is a top view of the pedal.
FIG. 4 is a sectional view of FIG. 3.
FIG. 5 is a perspective view of a pedal cover.
FIG. 6 is a perspective view of a cleat with a protective ridge.

DESCRIPTION OF A PREFERRED EMBODIMENT

Figure 1:
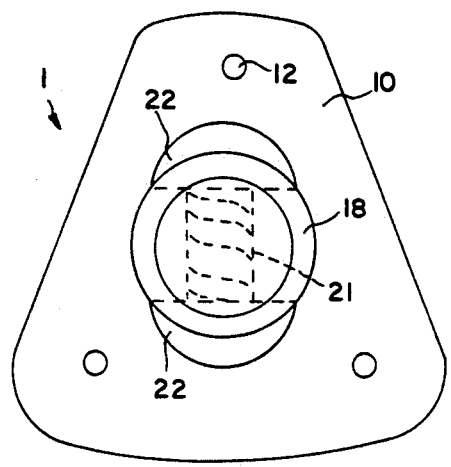

Turning now to a discussion of the drawings, FIG. 1 is a top view of a cleat 11 showing a cleat plate 10 that is attached to the sole of a shoe (not shown) by bolts or rivets in hole 12.

Figure 2:
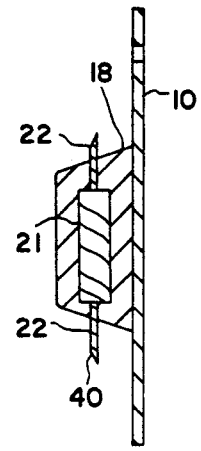

FIG. 2 is a sectional view taken through 2—2 of FIG. 1. Cleat 11 includes a conical section 18 having transverse bore 21 housing spring 20 which biases two sliding catch plates 22 away from one another. Each catch plate is slidingly lodged in recesses in the outer surface of the conical section 18. Catch surfaces 40 are bevelled as shown.

Figure 3:
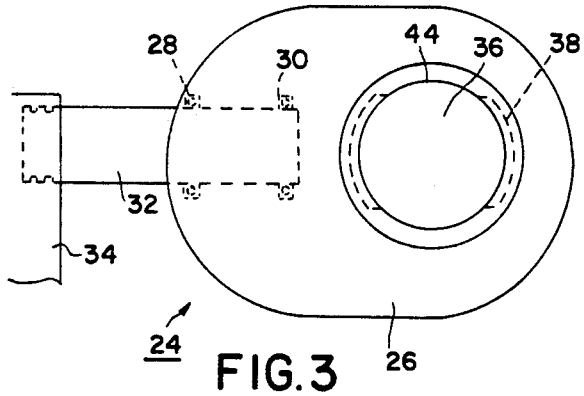

FIG. 3 shows the top view of a pedal 24 including a pedal plate 26 having one edge journalled by bearings 28 and 30 onto pedal post 32 that screws into pedal crank 34. Pedal plate 26 has an opening 36 having an inner wall with transverse groove 38 shown in phantom in FIG. 3.

Figure 4:
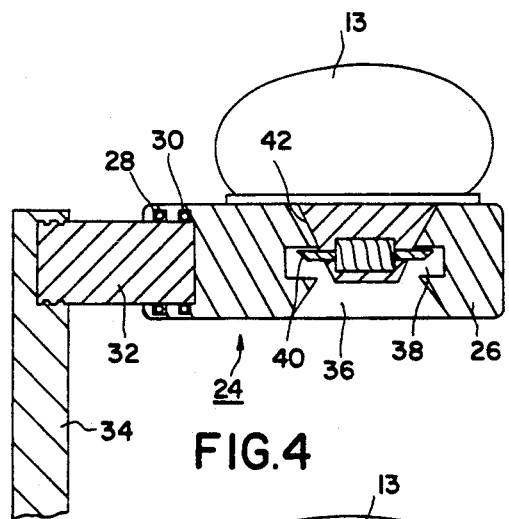

FIG. 4 is a sectional view taken along line of sight 4—4 shown in FIG. 3. Groove 38 is not a complete ring around the inner wall as shown in FIG. 3. Inner wall surfaces 42 of the opening are bevelled as shown in FIG. 4.

The foot is attached to the pedal by forcing the conical section 18 down into the opening 36 so that the catch plates 22 are first recessed by sliding contact of bevelled surfaces 42 and 40 and then snap back to engage the groove 38 as shown in FIG. 4. In order to release the cleat from the pedal plate, the foot is rotated in either direction. The outer edges of the catch plates 22 are thereby forced to recess back into the conical section 18 by contact with inner wall section inner surface 44 of opening 36 thereby permitting withdrawal of the catches 22.

In the foregoing paragraphs, an embodiment has been described which meets the objects of the invention. The crux of the invention is a flat pedal plate with an opening that may recieve a cleat on either side of the pedal so that there is no delay to orient the pedal in order to engage the cleat. The plate is flat on both sides so that the cyclist may use the pedal comfortably regardless of whether he is wearing cleats. The pedal feels and operates like a normal pedal when he is not wearing cleats. The strength of attachment does not depend on spring bias. The cleat is small enabling the cyclist to walk comfortably when wearing cleats.

Other variations in the construction of the cleat and pedal which are embodiments of this invention may be suggested by reading the description and studying the drawings which are embodiments of the invention.

For example, the groove and catches may be oriented parallel to the axis of rotation of the pedal.

The surfaces of the cleat and the faces on both sides of the pedal may be textured so as to minimize but not prevent rotation of the knee while pumping the pedals.

Figure 5:
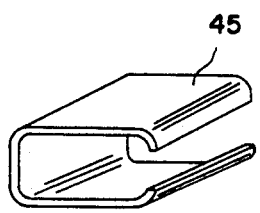

FIG. 5 shows a pedal cover 45 provided as an accessory which the cyclist may clip over the pedal 26 (FIG. 3) to provide more uniform distribution of pressure on the bottom of his foot in the event he rides his bicycle without his cleats.

Figure 6:
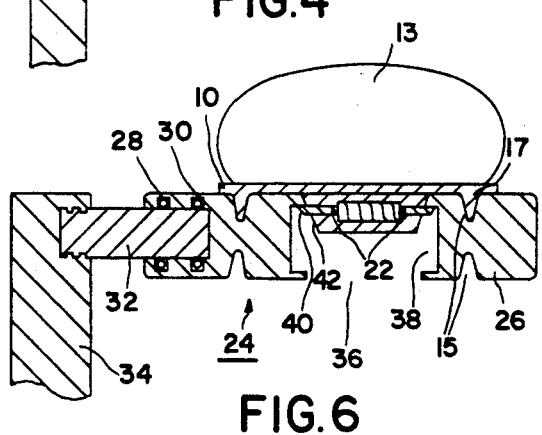

FIG. 6 shows the cleat and pedal configuration of FIG. 4 (cleat 10 is attached to the sole of the shoe 13 in FIG. 4 and 6) with the addition of a ridge 17 on the bottom of the cleat 10 surrounding conial section 18 and mating with a depression 15 in the pedal 26. The ridge 17 protects the conical section when the cyclist is walking.

In view of these and other variations and modifications that are within the scope of my invention, I therefore wish to define the scope of my invention by the appended claims and in view of the specification if need be.

I claim:

1. A device for detachably clipping a sole of a cyclist's shoe to a pedal of a bicycle wherein said bicycle includes a pedal crank with a pedal end, said device comprising:
   a pedal plate with two substantially flat opposing pedal surfaces mounted on said pedal end to rotate about a center line passing through said pedal plate parallel to said surfaces adapted for transmitting force from said foot to said crank;
   said pedal plate having an opening extending from one said pedal surface to said other pedal surface;
   said opening having an inner wall with a groove;
   a cleat plate having a first cleat surface and a second cleat surface substantially parallel to said first and a third cleat surface connecting said first and second cleat surfaces cleat surface;
   means for attaching said first cleat surface against said sole;
   catch means mounted on said third cleat surface for detachably engaging said groove when said cleat plate is positioned on either side of said pedal plate.

2. A device for detachably clipping a sole of a cyclist's shoe to a pedal of a bicycle wherein said bicycle includes a pedal crank with a pedal end, said device comprising:
   a pedal plate means with two substantially flat opposing pedal surfaces and mounted on said pedal end to rotate about an axis passing through said pedal plate parallel to said surfaces for transmitting force from said foot to said crank:
   said pedal plate means having an opening extending from one said pedal surface to said other pedal surface;
   said opening having an inner wall with a groove;
   a cleat plate having a first cleat surface and a second cleat surface substantially parallel to said first cleat surface;
   means for attaching said best cleat surface against said sole;
   said cleat plate having a substantially conical section having a flat side meeting a conical side, said flat side securely interfacing said second cleat surface;
   catch plane means slidably mounted in a recess in said conical side for engaging said groove;
   spring means secured in said conical section and positioned for biasing said catch plate means against said surface wall of said opening in operable arrangement for engaging said groove in said wall.

3. A device as in claim 2 wherein said at least one catch plate has a bevelled edge and said wall has a bevel, said bevel and bevelled edges configured in operable combination with one another to provide that, when said conical section is forced into said opening, said catch plate is initially recessed into said recess in said conical section and engages said groove when said conical section is fully inserted into said opening in said pedal plate means.

4. A device as in claim 3 wherein said groove is configured in operable combination with said bevelled edge of said at least one catch plate to provide that, when said sole is turned in one orientation, said at least one catch plate is engaged in said groove and when said sole is oriented in another orientation, said at least one catch plate is disengaged from said groove thereby permitting separation of said cyclists foot from said pedal.

5. A device as in claim 2 wherein said opening in said pedal plate is substantially circular.

6. A device as in claim 2 wherein said cleat plate has bolt holes and said attaching means are bolts in said holes attached to said soles.

7. A device as in claim 2 wherein said second surface abutts one of said pedal surfaces of said pedal plate when said cleat means is secured to said pedal plate means and said second cleat surface and said pedal surfaces are textured thereby preventing excessive rotation of a knee of said cyclist when pedalling with said device.

8. A device as in claim 2 wherein said conical section has a transverse bore and said spring means comprises a helical spring in said bore with one spring end biasingly abutting one said catch plate toward said inner wall and into said groove and another spring end biasingly abutting another said catch plate in an opposite direction and toward said inner wall and into said groove.

9. A device as in claim 2 wherein said pedal plate means comprises: an axel having a first end and a second end, said first end threaded for screwing onto an end of said pedal crank such that said axel is substantially perpendicular to said crank and; a plate with said pedal surfaces having said opening and an edge journalled onto said second end of said axel such that opposing pedal surfaces of said plate are substantially parallel to said axel.

10. A device for detachably clipping a sole of a cyclist's shoe to a pedal of a bicycle wherein said bicycle includes a pedal crank with a pedal end, said device comprising:
- a pedal plate means with two substantially flat opposing pedal surfaces and mounted on said pedal end to rotate about an axis passing through said pedal plate parallel to said surfaces for transmitting force from said foot to said crank;
- said pedal plate means having an opening extending from one said pedal surface to said other pedal surface;
- a cleat means attached to said sole for detachable engagement in said opening adjacent to either pedal surface
- a detachable cover means for simultaneously engaging both said opposing pedal surfaces such as to cover said opening on both said opposing surfaces.

11. A device for detachably clipping a sole of a cyclist's shoe to a pedal of a bicycle wherein said bicycle includes a pedal crank with a pedal end, said device comprising:
- a pedal plate means with two substantially flat opposing pedal surfaces and mounted on said pedal end to rotate about an axis passing through said pedal plate parallel to said surfaces for transmitting force from said foot to said crank;
- said pedal plate means having an opening extending from one said pedal surface to said other pedal surface;
- said opening having an inner wall with a groove;
- a cleat plate having a first cleat surface and a second cleat surface substantially parallel to said first cleat surface;
- means for attaching said first cleat surface against said sole;
- said cleat plate having outstanding ridges and each said pedal surface has a depression, each said depression configured to mate to said ridge when said second cleat surface abuts a respective one of said pedal surfaces.

12. A device for detachably clipping a sole of a cyclist's shoe to a pedal of a bicycle, comprising:
- a cleat having a cleat housing for attachment to a bottom surface of a cyclist's shoe, a pair of plate-like catches slidably mounted within the cleat housing and resilient means for applying a holding force to said catches which acts on the catches in a direction holding them in an outwardly extended position projecting from said cleat housing, said catches being inwardly displaceable toward each other upon application of a retraction force to the catches sufficient to overcome the holding force of said resilient means; and
- a pedal having opposed, inwardly facing catch retention grooves for attachment of the cleat to the pedal at each of opposite sides of the pedal, said catch retention grooves being spaced at a distance from each other sufficient to enable at least a portion of the cleat housing containing said plate-like catches to be received therebetween, each of said grooves having an opening into which a respective plate-like catch is insertable for connection of the respective plate-like catch therewith, said opening being bounded by horizontally and vertically oriented wall surfaces;
- wherein said plate-like catches are shaped relative to said pedal in a manner acting to produce said retraction force by engagement therebetween as the cleat is pressed downwardly into the space between said catch retention grooves by a cyclist's foot;
- wherein said horizontally oriented wall surfaces and corresponding surfaces of the plate-like catches are shaped relative to each other in a manner acting to prevent creation of said retraction force by engagement therebetween as the pedal is pulled upwardly by a cyclist's foot; and
- wherein said vertically oriented wall surfaces and corresponding surfaces of the catches are shaped relative to each other in a manner acting to produce said retraction force by engagement therebetween upon rotation of the cleat relative to the pedal, thereby enabling the cleat to be detached from said pedal.

13. A device as in claim 12, wherein the pedal is provided with a through-opening extending between said opposite sides of the pedal, the opening of said catch retention grooves communicating with said through-opening.

* * * * *